(12) United States Patent
Todd

(10) Patent No.: US 10,530,859 B1
(45) Date of Patent: Jan. 7, 2020

(54) BLOCKCHAIN FUNCTIONALITIES IN DATA STORAGE SYSTEM

(71) Applicant: EMC IP Holding Company LLC, Hopkinton, MA (US)

(72) Inventor: Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 412 days.

(21) Appl. No.: 15/361,651

(22) Filed: Nov. 28, 2016

(51) Int. Cl.
*H04L 9/06* (2006.01)
*H04L 29/08* (2006.01)
*G06F 3/06* (2006.01)

(52) U.S. Cl.
CPC ........ *H04L 67/1097* (2013.01); *G06F 3/0604* (2013.01); *G06F 3/067* (2013.01); *G06F 3/0629* (2013.01)

(58) Field of Classification Search
CPC ............... H04L 67/1042; H04L 9/0637; H04L 2209/38; G06F 21/604; G06F 21/6209
See application file for complete search history.

(56) References Cited

U.S. PATENT DOCUMENTS

| | | | | |
|---|---|---|---|---|
| 2008/0263304 | A1* | 10/2008 | Kaneda | G06F 3/0605 711/170 |
| 2014/0108211 | A1* | 4/2014 | Bogdanov | G06Q 40/02 705/30 |
| 2017/0005804 | A1* | 1/2017 | Zinder | H04L 9/3247 |
| 2017/0031676 | A1* | 2/2017 | Cecchetti | G06F 8/65 |
| 2017/0054611 | A1* | 2/2017 | Tiell | G06F 16/285 |
| 2017/0103468 | A1* | 4/2017 | Orsini | G06Q 40/12 |
| 2017/0214699 | A1* | 7/2017 | Johnsrud | H04L 63/126 |
| 2018/0053158 | A1* | 2/2018 | White | G06Q 20/227 |
| 2018/0137507 | A1* | 5/2018 | Jayachandran | G06Q 20/401 |
| 2018/0285879 | A1* | 10/2018 | Gadnis | G06Q 20/38 |

OTHER PUBLICATIONS

S. Nakamoto, "Bitcoin: A Peer to Peer Electronic Cash System," http://bitcoin.org/bitcoin.pdf, Nov. 2008, 9 pages.

* cited by examiner

*Primary Examiner* — Oanh Duong
(74) *Attorney, Agent, or Firm* — Ryan, Mason & Lewis, LLP

(57) ABSTRACT

An apparatus in one embodiment comprises one or more processing devices operatively coupled to form a data storage system. The data storage system comprises a data storage manager configured to provide integrated control for a set of logic modules, wherein the set of logic modules comprise at least one blockchain logic module and one or more of a file storage logic module, a block storage logic module, and an object storage logic module. The data storage system further comprises a plurality of storage volumes operatively coupled to the data storage manager and configured to store data associated with each of the set of logic modules, under control of the data storage manager, in accordance with selectable storage capacity allocations for each of the set of logic modules.

20 Claims, 5 Drawing Sheets

```
Input:
Previous tx: f5d8ee39a430901c91a5917b9f2dc19d6d1a0e9cea205b009ca73dd04470b9a6
Index: 0
scriptSig: 30450220e621798a42fae0e854281abd38bacd1aeed3ee3738d9e1446618c4571d10
90db022100e2ac980643b0b82c0e88ffdfec6b64e3e6ba35e7ba5fdd7d5d6cc8d25c6b241501

Output:
Value: 5000000000
scriptPubKey: OP_DUP OP_HASH160 404371705fa9bd789a2fcd52d2c580b65d35549d
OP_EQUALVERIFY OP_CHECKSIG
```

*FIG. 3B*
310

| FIELD SIZE | DESCRIPTION | DATA TYPE | COMMENTS |
|---|---|---|---|
| 4 | version | int32_t | BLOCK VERSION INFORMATION (NOTE, THIS IS SIGNED) |
| 32 | prev_block | char[32] | THE HASH VALUE OF THE PREVIOUS BLOCK THIS PARTICULAR BLOCK REFERENCES |
| 32 | merkle_root | char[32] | THE REFERENCE TO A MERKLE TREE COLLECTION WHICH IS A HASH OF ALL TRANSACTIONS RELATED TO THIS BLOCK |
| 4 | timestamp | uint32_t | A UNIX TIMESTAMP RECORDING WHEN THIS BLOCK WAS CREATED (CURRENTLY LIMITED TO DATES BEFORE THE YEAR 2106!) |
| 4 | bits | uint32_t | THE CALCULATED DIFFICULTY TARGET BEING USED FOR THIS BLOCK |
| 4 | nonce | uint32_t | THE NONCE USED TO GENERATE THIS BLOCK... TO ALLOW VARIATIONS OF THE HEADER AND COMPUTE DIFFERENT HASHES |
| ? | txn_count | var_int | NUMBER OF TRANSACTION ENTRIES |
| ? | txns | tx[] | BLOCK TRANSACTIONS, IN FORMAT OF "TX" COMMAND |

402 — PROVIDE INTEGRATED CONTROL IN A DATA STORAGE SYSTEM FOR A SET OF LOGIC MODULES, WHEREIN THE SET OF LOGIC MODULES COMPRISE AT LEAST ONE BLOCKCHAIN LOGIC MODULE AND ONE OR MORE OF A FILE STORAGE LOGIC MODULE, A BLOCK STORAGE LOGIC MODULE, AND AN OBJECT STORAGE LOGIC MODULE

404 — STORE, ON A PLURALITY OF STORAGE VOLUMES OF THE DATA STORAGE SYSTEM, DATA ASSOCIATED WITH EACH OF THE SET OF LOGIC MODULES IN ACCORDANCE WITH SELECTABLE STORAGE CAPACITY ALLOCATIONS FOR EACH OF THE SET OF LOGIC MODULES

406 — PROVIDE ONE OR MORE FEATURES IN A USER INTERFACE FOR: SELECTING THE STORAGE CAPACITY ALLOCATIONS FOR EACH OF THE SET OF LOGIC MODULES; PRESENTING THE SELECTED STORAGE CAPACITY ALLOCATIONS FOR EACH OF THE SET OF LOGIC MODULES; AND PRESENTING A VALUE REALIZED BY THE DATA STORAGE SYSTEM DUE TO EXECUTION OF THE BLOCKCHAIN LOGIC MODULE

BLOCKCHAIN FUNCTIONALITIES IN DATA STORAGE SYSTEM

FIELD

The field relates generally to data storage systems, and more particularly to techniques for expanding the functionalities of such data storage systems.

BACKGROUND

The growth in popularity and usage of electronic cash systems such as bitcoin is in large part due to the underlying blockchain protocol. The blockchain protocol allows for two parties in a computer network to transact directly with each other without a trusted third party, see, e.g., S. Nakamoto, "Bitcoin: A Peer to Peer Electronic Cash System," 2008, the disclosure of which is incorporated by reference herein in its entirety.

Protocols such as blockchain accomplish this level of trust by creating distributed, secure, and timestamped blocks of transactions throughout the computer network. Linked chains of these blocks are maintained by a trusted community of participants that forego the use of a third party to validate trust via the community. The financial community has taken to calling blockchain implementations "distributed ledgers." However, such blockchain usage has already expanded beyond financial transactions and into a wide variety of non-financial use cases.

SUMMARY

Illustrative embodiments of the invention provide techniques for expanding the functionalities of data storage systems by integrating blockchain functionalities into such data storage systems.

For example, in one embodiment, an apparatus comprises one or more processing devices operatively coupled to form a data storage system. The data storage system comprises a data storage manager configured to provide integrated control for a set of logic modules, wherein the set of logic modules comprise at least one blockchain logic module and one or more of a file storage logic module, a block storage logic module, and an object storage logic module. The data storage system further comprises a plurality of storage volumes operatively coupled to the data storage manager and configured to store data associated with each of the set of logic modules, under control of the data storage manager, in accordance with selectable storage capacity allocations for each of the set of logic modules.

In another embodiment, the data storage system is configured to operate in a peer-to-peer communications protocol over a network with one or more compute nodes.

In a further embodiment, the data storage manager comprises a user interface, wherein the user interface comprises one or more interface features for: (i) selecting the storage capacity allocations for each of the set of logic modules; (ii) presenting the selected storage capacity allocations for each of the set of logic modules; and (iii) presenting a value realized by the data storage system due to execution of the blockchain logic module.

Advantageously, illustrative embodiments integrate one or more aspects of a block chain protocol (e.g., distributed ledger and proof of work operations) within a data storage system that provides file, block and/or object storage functionalities. The expanded blockchain-functional data storage system earns monetary or other value to at least partially offset the cost of operating the data storage system.

These and other illustrative embodiments include, without limitation, methods, apparatus, systems, computer networks and computer program products comprising processor-readable storage media.

BRIEF DESCRIPTION OF THE DRAWINGS

FIG. 3A illustrates an example of a distributed ledger protocol transaction processed in accordance with an illustrative embodiment.

FIG. 3B illustrates an example of a distributed ledger output block processed in accordance with an illustrative embodiment.

FIG. 4 illustrates a process for data storage management with blockchain functionalities in accordance with an illustrative embodiment.

DETAILED DESCRIPTION

Figure 1:
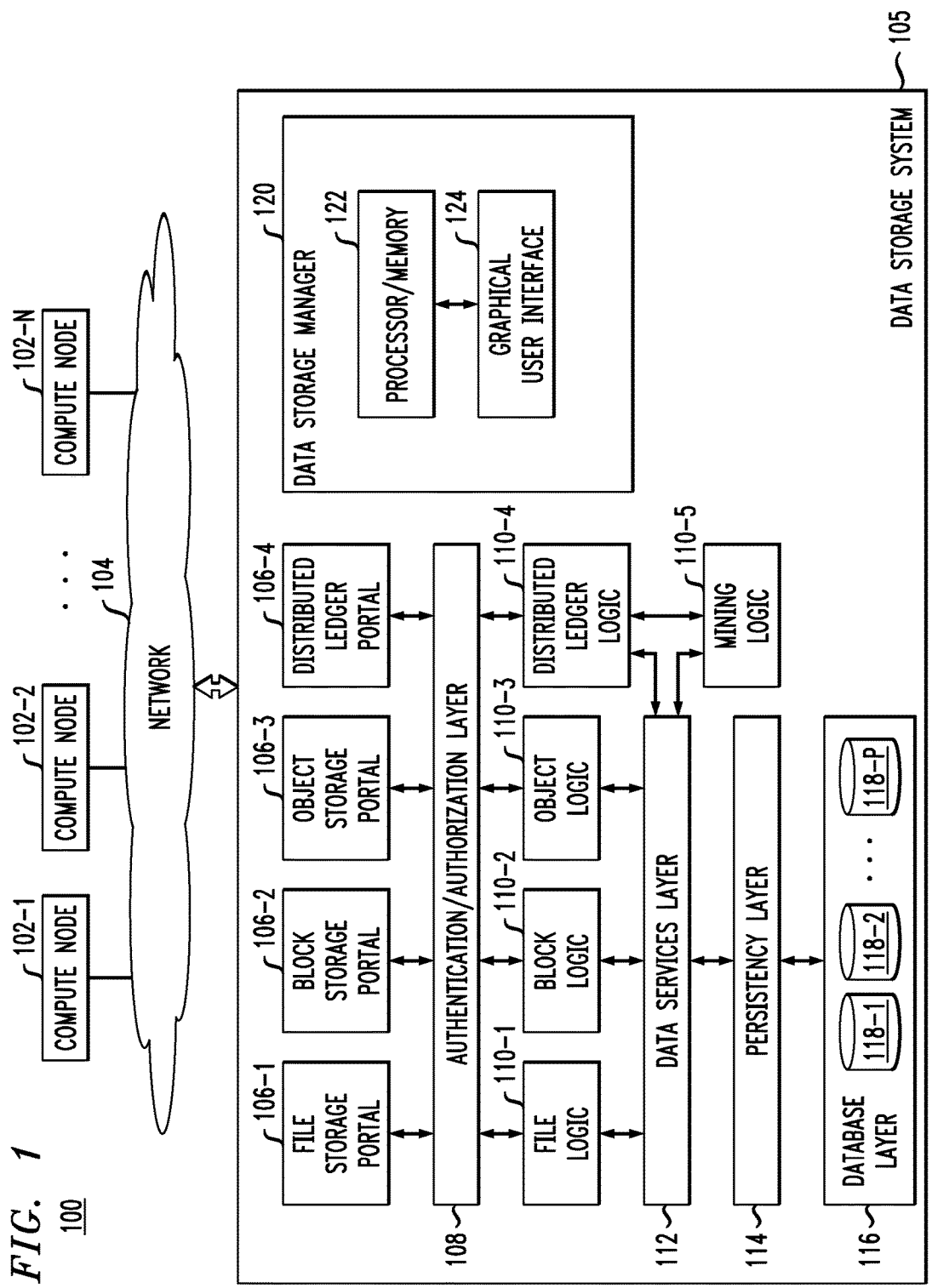
FIG. 1 illustrates a computer network comprising a data storage system configured for data storage management with blockchain functionalities in an illustrative embodiment.

Illustrative embodiments of the present invention will be described herein with reference to exemplary computer networks and associated computers, storage devices and other types of processing devices of the networks. It is to be appreciated, however, that the invention is not restricted to use with the particular illustrative computer network and processing device configurations shown. Accordingly, the term "computer network" as used herein is intended to be broadly construed, so as to encompass, for example, any system comprising multiple networked processing devices.

As used herein, the terms "blockchain" and "digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction and a hash value of the previous block in the chain, i.e., the previous transaction. Thus, advantageously, each data block in the blockchain represents a given set of transaction data plus a set of all previous transaction data. In the case of a bitcoin implementation, a blockchain contains a record of all previous transactions that have occurred in the bitcoin network.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate cryptographic processes may be used to maintain and add to a secure chain of data blocks in accordance with embodiments of the invention.

Embodiments of the invention realize that a traditional data storage system can be configured to implement one or more aspects of the blockchain protocol, i.e. a traditional data storage system can participate in a blockchain protocol and provide computational and/or storage services to earn monetary or other value. A "traditional data storage system" illustratively refers to a data storage system that is configured to store data in accordance with one or more types of data storage protocols including, but not limited to, file storage, block storage, and object storage.

As is known, file storage is a storage protocol whereby data is stored in files which are accessible via a hierarchical organization structure called a file system. Metadata about each file (e.g., file owner, access permissions, size, modification date, etc.) is stored as part of the file system.

Block storage is a storage protocol whereby data is stored as chunks of data (that may or may not otherwise be combined to create a file). A block typically has no owner or association metadata, and does not effectively have context until an application program accesses it and possibly combines the block with one or more other blocks. In this way, block storage is a more microscopic approach to controlling storage as compared to file storage.

Object storage is a storage protocol whereby data is stored as an object. The data may be a file and its metadata. The object is assigned an identifier (ID) that is typically calculated based on its content (i.e., content-addressable object). Unlike file and block storage, objects are stored in a flat storage structure and accessible simply by presenting the object ID.

It is to be appreciated that the above descriptions of data formats stored in a traditional data storage system are not intended to be limiting to embodiments of the invention. Alternative forms of file, block, and/or object storage, as well as other storage formats, may be included in a data storage system with which embodiments of the invention are implemented.

FIG. 1 shows a computer network 100 configured in accordance with an illustrative embodiment of the invention. The computer network 100 comprises a plurality of compute nodes 102-1, 102-2, . . . 102-N, collectively referred to herein as compute nodes 102. The compute nodes 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a data storage system 105.

Each of at least a subset of the compute nodes 102 may be implemented in the form of one or more host devices configured to execute application programs (applications) on behalf of one or more users of the computer network 100. For example, in accordance with illustrative embodiments, the compute nodes execute a blockchain (digital ledger) protocol application for computing blockchain values as described above. However, additionally or alternatively, one or more of the compute nodes 102 may execute other applications that otherwise utilize file, block and/or object storage services.

The compute nodes 102 may comprise, for example, mobile telephones, laptop computers, tablet computers, desktop computers or other types of devices capable of supporting user access to network resources. Such devices are examples of what are more generally referred to herein as "processing devices." Some of these processing devices are also generally referred to herein as "computers."

The compute nodes 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also included in the computer network 100 is a data storage system 105 configured according to an illustrative embodiment. The compute nodes 102 communicate with the data storage system 105 over the network 104. As mentioned above, illustrative embodiments expand the functionalities of a traditional data storage system by integrating blockchain functionalities into the traditional data storage protocols of such a data storage system. Data storage system 105 is an example of a data storage system with blockchain integrated functionalities. It is to be appreciated that while data storage system 105 depicts support for file, block, and object storage protocols as part of its storage functionalities, data storage systems in alternative embodiments may implement one or more of these types of storage and/or support alternative storage protocols beyond file, block and object storage protocols.

As further shown in FIG. 1, data storage system 105 comprises a plurality of input portals comprising a file storage portal 106-1, a block storage portal 106-2, an object storage portal 106-3, and a distributed ledger portal 106-4. Each portal is configured to receive and send messages and other data consistent with the functionality of the protocol assigned to the portal, e.g., file storage protocol (file storage portal 106-1), block storage protocol (block storage portal 106-2), object storage protocol (object storage portal 106-3), and blockchain protocol (distributed ledger protocol 106-4).

Further, data storage system 105 comprises an authentication/authorization layer 108. Authentication/authorization layer 108 provides access permission for requests entering the portals so that the senders and/or the requests can be authorized and authenticated before they are passed to the functional storage system layers below the authentication/authorization layer 108. Such access permission can include authorization and authentication techniques that are present in a traditional data storage system.

Operatively coupled below the authentication/authorization layer 108 is the logic layer that comprises the logic (logic module) for each of the supported protocols, i.e., file storage logic 110-1, block storage logic 110-2, object storage logic 110-3, and distributed ledger logic 110-4 and mining logic 110-5 (collectively referred to as a blockchain module). The logic in each module (each of 110-1 through 110-5) comprises software instructions and/or programmable hardware that serves to implement the functional processes that enable the specific protocol. The logic modules (110-1 through 110-5) are operatively coupled to a data services layer 112. The data services layer 112 is operatively coupled to a persistency layer 114. The persistency layer 114 is operatively coupled to a database layer 116 which comprises a plurality of distinct storage volumes 118-1, 118-2, . . . 118-P.

The data services layer 112 provides data services that are available in a traditional data storage system including, but not limited to, tiering, searching/querying, and masking. The persistency layer 114 provides persistency services that are available in a traditional data storage system including, but not limited to, locking, version control, and optimizations. The database layer 116 including storage volumes 118-1, 118-2, . . . 118-P is the layer where data is stored in either file, block, or object format, as well as data associated with the blockchain protocol as will be further described.

Still further, as shown, data storage system 105 comprises a data storage manager 120. Data storage manager 120 comprises a processor/memory 122 operatively coupled to a graphical user interface 124. The data storage manager 120, under control of the processor/memory 122, manages the integrated blockchain and storage functionalities provided across the various portals, layers, logic modules, and storage volumes of the data storage system 105.

Figure 2:
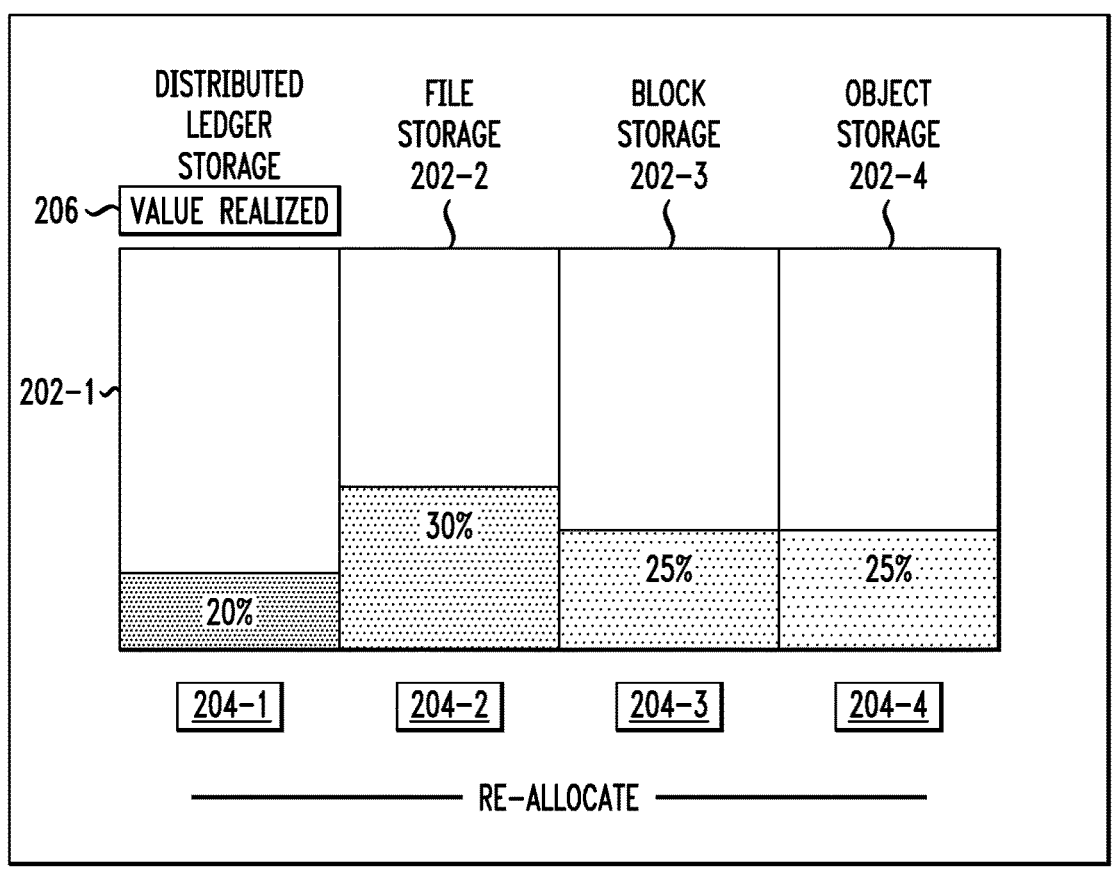
FIG. 2 illustrates a data storage management dashboard in accordance with an illustrative embodiment.

Graphical user interface 124, as will be illustrated and further described in the context of FIG. 2, provides a dashboard with user-selectable features for controlling the percent storage capacity allocation of the database layer 116 and its storage volumes with respect to the different types of protocols (multi-protocol storage access) supported by the data storage system 105, i.e., file, block, object, and distributed ledger.

Although only a single data storage system 105 is shown in the FIG. 1 embodiment, this embodiment and other embodiments disclosed herein can include multiple data storage systems. A given data storage system may be part of a larger data storage system, e.g., a data center. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given data storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given data storage system in an illustrative embodiment.

The data storage system 105 can illustratively comprise a single storage array, storage disk, storage drive or other type of storage device within the computer network 100. Alternatively, the data storage system 105 can comprise one or more storage systems each having multiple storage devices implemented therein. The term "storage device" as used herein is therefore intended to be broadly construed.

The data storage system 105 in some embodiments may be co-located with the compute nodes 102, for example, within a particular data center or other facility of a given enterprise. Alternatively, the data storage system 105 may be implemented in cloud infrastructure that is remote from the compute nodes 102.

FIG. 2 illustrates a data storage management dashboard 200 in accordance with an illustrative embodiment. Dashboard 200 can be considered as an example of a graphical user interface (e.g., GUI 124) that provides user-selectable features for controlling the percent storage capacity allocation of the database layer 116 and its storage volumes with respect to the multi-protocol storage access supported by the data storage system 105, i.e., file, block, object, and distributed ledger.

As shown, dashboard 200 comprises a plurality of percent storage capacity allocation areas 202-1, 202-3, 202-3, and 202-4 for each of the protocols supported by the data storage system 105, i.e., distributed ledger storage (202-1), file storage (202-2), block storage (202-3), and object storage (202-4). Each percent storage capacity allocation area visually depicts the percentage of the total storage capacity of the database layer 116 including storage volumes 118-1, 118-2, . . . 118-P that is currently allocated to the given protocol. By way of example only, dashboard 200 indicates that 20% of the total storage capacity of the database layer 116 is allocated to storage for the distributed ledger protocol, 30% to file storage, 25% to block storage, and 25% to object storage.

Dashboard 200 also comprises controls 204-1, 204-2, 204-3, and 204-4 which enable a user (e.g., system administrator) to automatically change (re-allocate) the respective storage capacity allocations for distributed ledger storage, file storage, block storage, and object storage. Each of the allocation controls may include a field for the user to enter a percentage, and/or +/− buttons to increase/decrease the percent allocation.

"Value realized" field 206 on dashboard 200 indicates the value (monetary or otherwise) that is being realized by the data storage system 105 in accordance with its support of the distributed ledger protocol. For example, when the data storage system 105 is supporting a bitcoin application, field 206 can depict how many bitcoins have been earned by the data storage system based on computational and/or storage services provided by the data storage system 105. Additionally or alternatively, field 206 can provide an indication of how much money per month (or per any selectable time period) the data storage system 105 is earning based on a given percent storage capacity allocation. This gives the system administrator the ability to make a decision as to how to distribute (re-allocate) the storage capacity across the multiple protocols (distributed ledger, file, block, and object).

Given the illustrative storage architecture described above in the context of FIGS. 1 and 2, further details of how the functionalities associated with the blockchain protocol are integrated with traditional storage services provided for file, block and object storage will now be provided.

FIG. 3A illustrates an example of a distributed ledger protocol transaction 300 processed in accordance with an illustrative embodiment. Recall that in the data storage system 105 of FIG. 1, distributed ledger portal 106-4 is configured to accept requests from peer nodes (one or more compute nodes 102). Transaction 300 represents an example of a request for the distributed ledger logic 110-4 and/or mining logic 110-5 to store the request or some part of a blockchain and/or compute a hash value for the new transaction. Thus, portal 106-4 would accept a request such as, for example, a bitcoin transaction, which is highlighted in FIG. 3A.

As execution of the distributed ledger protocol progresses through the data storage system 105, in a permission-less mode, the request (e.g., 300 in FIG. 3A) passes directly to the distributed ledger logic 110-4. For example, if the data storage system 105 implements a pure form of the bitcoin protocol, there would be no need to perform additional validation on the request other than the normal validation performed by the bitcoin specification and implemented in the distributed ledger logic 110-4.

If, however, the data storage system is selected to run in a permissioned mode, it performs business-specific authentication and authorization in layer 108 before passing execution to the distributed ledger logic 110-4. In this way, the distributed ledger protocol leverages the authentication and authorization services that are already in place for the legacy storage (e.g., file, block and object) protocols.

After the distributed ledger logic 110-4 has executed (further described below), the output of the logic is routed back out through the data storage system 105 (back through portal 106-4) and broadcast to registered peers in the blockchain network (e.g., one or more of compute nodes 102). For example, FIG. 3B shows the format of an outgoing block 310 that has been generated in a bitcoin implementation, e.g., by distributed ledger logic 110-4.

It is to be appreciated that the distributed ledger logic 110-4 is the portion of code running inside the data storage system 105 which gives the data storage system its overall blockchain functionalities. By way of example, distributed ledger logic 110-4 contains the following functionality (including network join capabilities):

i) Use of network broadcast services to send or receive transactions and/or blocks; time synchronization algorithms which can be shared with other storage (legacy) protocols. For example, Centera uses Network Time Protocol (NTP) for timestamping of incoming content. As such, the distributed ledger logic 110-4 can access and use this NTP function to provide timestamping functionality within the distributed ledger protocol;

ii) Version exchange with peers (e.g., which version of distributed ledger logic 110-4 is being executed) and acceptance/rejection of connection based on version number; and iii) Ledger synchronization: when joining a new network, a node may request that the current ledger be synchronized;

iv) Maintaining a list of all peers participating in the distributed ledger protocol, and continually announcing (e.g., every 24 hours) their distributed ledger IP addresses; and v) Relaying: when a peer sends a request to distribute a transaction (e.g., request 300 in FIG. 3A), the distributed ledger logic 110-4 checks whether or not it has the transaction, asks for the transaction if it does not have it, and then relays to other peer nodes (who may in turn ask for the transaction if they do not have it).

As transactions flow into the distributed ledger portal 106-4, they are eventually saved into the distributed ledger. This process is referred to as mining. One of the unique aspects of adding the distributed ledger protocol to a traditional data storage system is that it enables mining logic to run alongside the other storage protocols and potentially leverage their data services. In data storage system 105, such mining logic is depicted as 110-5.

The purpose of mining is for peer nodes to reach a tamper-proof consensus (for the bitcoin protocol, it is also used to introduce new bitcoins into the system). Data storage systems such as system 105 have the option of solely being keepers of the ledger, or they can participate in some sort of mining activity. A mining plug-in that contains proof-of-work logic can be included within the business logic to serve this purpose, i.e., mining logic 110-5.

Within a storage system logic, there are a variety of approaches to implementing a proof of work algorithm. Non-limiting examples of such implementations include: embedding or porting distributed ledger mining code (e.g., bitcoin mining code) directly into the data storage system; implementing custom mining via hardware approaches, e.g., a graphics processing unit (GPU), a field programmable gate array (FPGA), or an application specific integrated circuit (ASIC); leveraging an underlying protocol (e.g., Centera's SHA hashing algorithm) to create blocks that satisfy the target hashing parameters of the distributed ledger protocol.

Depending on which digital ledger use case (e.g., bitcoin) is being used, the mining process itself can produce incentives (e.g., the introduction of new bitcoins that belong to the storage system). Recall that these incentives can be monitored (206) and controlled (204-1) via dashboard 200 in FIG. 2. Depending on how quickly the data storage system 105 creates blocks for a distributed ledger protocol, the data storage system 105 can serve as a source of revenue and reduce the overall operating expenditures (OPEX) for the data storage system.

Once the nodes in the network have accepted a new block for insertion into the distributed ledger, the data storage system 105 can leverage the legacy storage protocols to persist the new block. Given that many distributed ledgers use a blockchain approach of using content addresses to enforce immutability and backwards pointers to previous blocks, the distributed ledger logic 110-4 can leverage underlying object-based protocols (e.g., Centera) to persist these blocks via their content addresses, which facilitates fetching them when iterating backwards through the chain. Other options are to store blocks in a time-order system of directories via a file system interface. Leveraging file or object interfaces is useful for multi-protocol access.

Using the techniques described above, a multi-protocol storage system can access the distributed ledger through a variety of approaches: blockchain; file; object; Hadoop Distributed File System (HDFS) which can iterate over file/object, e.g., ViPR® or Isilon®.

Another advantage to storing distributed ledger blocks using underlying storage protocols as described herein in accordance with illustrative embodiments is to leverage the services that are already built-in to those services such as, but not limited to: tiering (e.g., by inspecting timestamps, and/or frequency of access); searching/querying, and masking (e.g., preventing one particular client from seeing another tenant's data).

Accordingly, illustrative embodiments of the invention provide many additional advantages. Examples of some of these advantages are as follows.

Integration of blockchain functionalities within a traditional data storage system allows for distributed ledger applications to exist alongside applications that leverage block and file protocols without having to add another storage silo that only supports the blockchain protocol.

Applications that are deployed through an application framework (e.g., CloudFoundry) consume services from underlying storage protocols by binding to a service (such as a database service). Illustrative embodiments are configured to provide binding mechanisms to automatically assign distributed ledger applications onto the underlying infrastructure.

Distributed ledger protocols require a timestamping capability that is in synchronization with other distributed ledger nodes in the peer-to-peer network. Data storage systems that support multiple protocols in accordance with illustrative embodiments have the ability to synchronize their internal clock with the peer systems using techniques such as NTP.

The earliest stages of bitcoin development anticipated that the size and scale of distributed ledgers would require that only the headers of the chain of blocks be kept in memory and older transactions would be discarded. However, as use cases expand for distributed ledger technologies, there is a need for keeping all previous transactions and blocks for purposes such as analytics or auditing. As such, data storage systems in accordance with illustrative embodiments are configured to move aged blocks to colder storage and retrieve them on access if and when needed.

Since distributed ledger applications must not have access to data stored on alternate protocols (e.g., block, file, object), and legacy applications that are accessing a storage system must not be able to view/access the distributed ledger data being stored on the system, illustrative embodiments provide existing multi-tenant isolation techniques that control access permissions by preventing unauthorized access.

Illustrative embodiments allow authorized applications to access distributed ledgers using a different protocol. For example, a blockchain application can be accessed using object-based techniques in accordance with illustrative embodiments. This can provide important advantages for search and/or analytics.

One of the key activities for distributed ledger systems (such as bitcoin) is to perform mining as proof that certain members of the peer-to-peer network are trusted because they dedicate computing resources to solve a computationally hard problem. By solving the problem (which can easily be validated by other nodes in the network) the node can prove that it can be trusted to validate and create ledger entries. Data storage systems in accordance with illustrative embodiments now have this capability while simultaneously providing traditional storage functions.

FIG. 4 illustrates a process 400 for data storage management with blockchain functionalities in accordance with an illustrative embodiment.

Step 402 provides integrated control in a data storage system for a set of logic modules, wherein the set of logic modules comprise at least one blockchain logic module and one or more of a file storage logic module, a block storage logic module, and an object storage logic module.

Step 404 stores, on a plurality of storage volumes of the data storage system, data associated with each of the set of logic modules in accordance with selectable storage capacity allocations for each of the set of logic modules.

Step 406 provides one or more features in a user interface for: selecting the storage capacity allocations for each of the set of logic modules; presenting the selected storage capacity allocations for each of the set of logic modules; and presenting a value realized by the data storage system due to execution of the blockchain logic module.

It is to be further appreciated that, additionally or alternatively, one or more user interface features can similarly be configured to enable a user to select computing capacity allocations for each of the set of logic modules.

As mentioned previously, at least portions of the computer network 100 may be implemented using one or more processing platforms. Illustrative embodiments of such platforms will now be described in greater detail in conjunction with FIGS. 5 and 6. Although described primarily in the context of computer network 100, these platforms may also be used to implement at least portions of other information processing systems in other embodiments of the invention.

Figure 5:
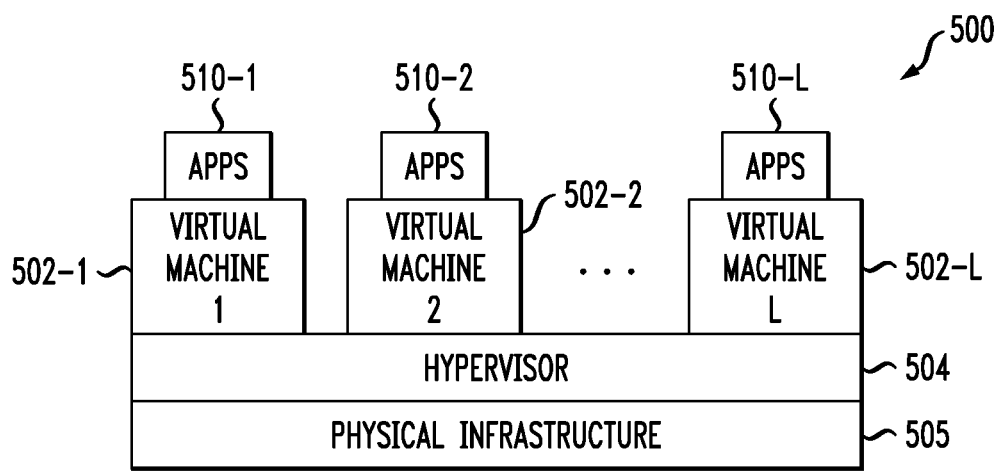
FIGS. 5 and 6 illustrate examples of processing platforms that may be utilized to implement at least a portion of a computer network in accordance with an illustrative embodiment.
Figure 6:
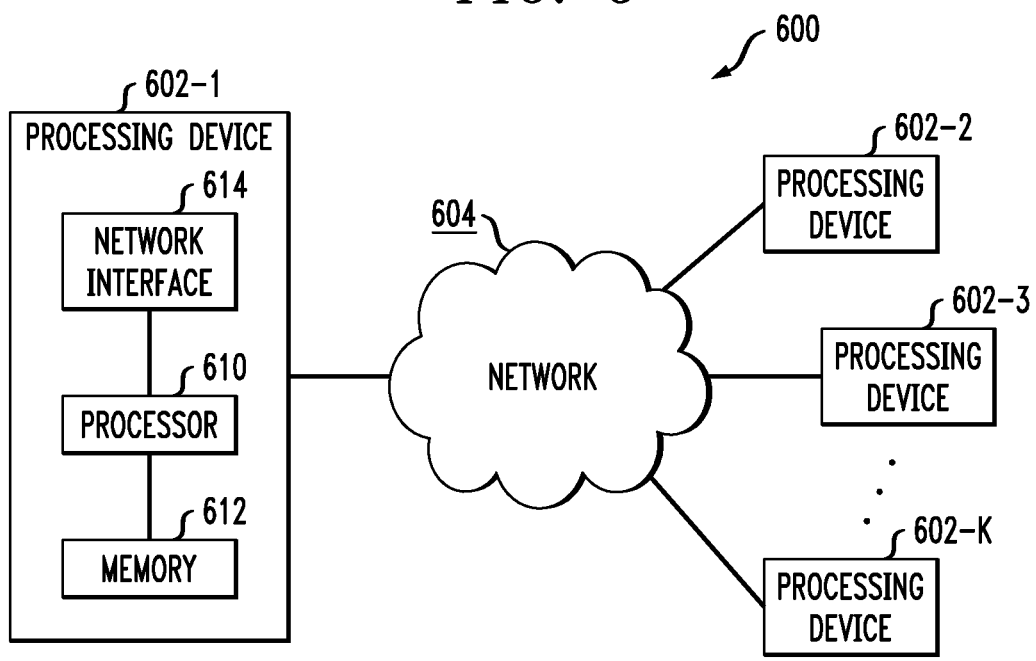

FIG. 5 shows an example processing platform comprising cloud infrastructure 500. The cloud infrastructure 500 comprises a combination of physical and virtual processing resources that may be utilized to implement at least a portion of the computer network 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the computer network 100 may of course include multiple hypervisors each providing a set of virtual machines using at least one underlying physical machine. Different sets of virtual machines provided by one or more hypervisors may be utilized in configuring multiple instances of various components of the network 100.

As is apparent from the above, one or more of the processing modules or other components of computer network 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of network 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the computer network 100, although in other embodiments a given tenant can have multiple containers. The containers may be utilized to implement a variety of different types of functionality within the computer network 100. For example, containers can be used to implement respective cloud compute nodes or cloud storage nodes of a cloud computing and storage system. The compute nodes or storage nodes may be associated with respective cloud tenants of a multi-tenant environment of computer network 100. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the computer network 100. Such components can communicate with other elements of the computer network 100 over any type of network or other communication media.

As indicated previously, components of a computer network as disclosed herein can be implemented at least in part in the form of one or more software programs stored in memory and executed by a processor of a processing device. For example, at least portions of compute nodes, data storage systems, or other components of a computer network are illustratively implemented in one or more embodiments in the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of compute nodes, data storage systems, and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
one or more processing devices operatively coupled to form a data storage system, the data storage system comprising:
a data storage manager configured to provide integrated control for a set of logic modules, wherein the set of logic modules comprise at least one blockchain logic module and one or more of a file storage logic module, a block storage logic module, and an object storage logic module; and
a plurality of storage volumes operatively coupled to the data storage manager and configured to store data associated with each of the set of logic modules, under control of the data storage manager, in accordance with selectable storage capacity allocations for each of the set of logic modules;
wherein the data storage manager further comprises a processor and a user interface, wherein the user interface comprises one or more interface features for selecting the storage capacity allocations for each of the set of logic modules and an interface feature for presenting a value realized by the data storage system due to execution of the blockchain logic module;
wherein the one or more processing devices are configured to execute program code to implement the data storage manager and the plurality of storage volumes.

2. The apparatus of claim 1, wherein the data storage system is configured to operate in a peer-to-peer communications protocol over a network with one or more compute nodes.

3. The apparatus of claim 1, wherein the user interface further comprises one or more interface features for presenting the selected storage capacity allocations for each of the set of logic modules.

4. The apparatus of claim 1, wherein the value presented by the interface feature is a monetary value over a given time period.

5. The apparatus of claim 1, wherein the data storage manager is further configured to enable the blockchain logic module to utilize one or more data storage services associated with one or more of the file storage logic module, the block storage logic module, and the object storage logic module.

6. The apparatus of claim 5, wherein the one or more data storage services comprise one or more of data tiering, data querying, and data masking.

7. The apparatus of claim 1, wherein the data storage manager is further configured to enable the blockchain logic module to utilize one or more authentication and authorization services associated with one or more of the file storage logic module, the block storage logic module, and the object storage logic module.

8. The apparatus of claim 7, wherein the data storage manager selectively enables a permission-less mode of operation and a permissioned mode of operation for the blockchain logic module in accordance with the one or more authentication and authorization services.

9. The apparatus of claim 1, wherein the blockchain logic module is configured to send and receive one or more of transactions and blocks that are associated with a distributed ledger computed in accordance with a blockchain protocol.

10. The apparatus of claim 1, wherein the blockchain logic module is configured to use a time synchronization algorithm associated with one or more of the file storage logic module, the block storage logic module, and the object storage logic module.

11. The apparatus of claim 1, wherein the blockchain logic module is configured to perform version exchange with one or more compute nodes in a peer-to-peer communications protocol.

12. The apparatus of claim 1, wherein the blockchain logic module is configured to perform distributed ledger synchronization with one or more compute nodes in a peer-to-peer communications protocol.

13. The apparatus of claim 1, wherein the blockchain logic module is configured to relay a transaction to one or more compute nodes in a peer-to-peer communications protocol.

14. The apparatus of claim 1, wherein the blockchain logic module is configured to perform proof of work mining associated with a distributed ledger in accordance with a blockchain protocol.

15. A method comprising:
providing integrated control in a data storage system for a set of logic modules, wherein the set of logic modules comprise at least one blockchain logic module and one or more of a file storage logic module, a block storage logic module, and an object storage logic module;
storing, on a plurality of storage volumes of the data storage system, data associated with each of the set of logic modules in accordance with selectable storage capacity allocations for each of the set of logic modules; and
providing a user interface with one or more interface features for selecting the storage capacity allocations for each of the set of logic modules and an interface feature for presenting a value realized by the data storage system due to execution of the blockchain logic module;
wherein the data storage system comprises one or more processing devices, each processing device comprising a processor operatively coupled to a memory.

16. The method of claim 15, wherein the value presented by the interface feature is a monetary value over a given time period.

17. The method of claim 15, further comprising enabling the blockchain logic module to utilize one or more data storage services associated with one or more of the file storage logic module, the block storage logic module, and the object storage logic module.

18. A computer program product comprising a non-transitory processor-readable storage medium having stored therein program code of one or more software programs, wherein the program code when executed by at least one processing device causes said at least one processing device to:
provide integrated control in a data storage system for a set of logic modules, wherein the set of logic modules comprise at least one blockchain logic module and one or more of a file storage logic module, a block storage logic module, and an object storage logic module;
store, on a plurality of storage volumes of the data storage system, data associated with each of the set of logic modules in accordance with selectable storage capacity allocations for each of the set of logic modules; and
provide a user interface with one or more interface features for selecting the storage capacity allocations for each of the set of logic modules and an interface feature for presenting a value realized by the data storage system due to execution of the blockchain logic module.

19. The computer program product of claim 18, wherein the value presented by the interface feature is a monetary value over a given time period.

20. The computer program product of claim 18, wherein the program code when executed by the at least one processing device causes said the at least one processing device to enable the blockchain logic module to utilize one or more data storage services associated with one or more of the file storage logic module, the block storage logic module, and the object storage logic module.

* * * * *